United States Patent
Feyrer et al.

(10) Patent No.: US 6,851,917 B2
(45) Date of Patent: Feb. 8, 2005

(54) MANIPULATOR DEVICE FOR REPOSITIONING PARTS

(75) Inventors: Thomas Feyrer, Esslingen (DE); Gerhard Thorwart, Filderstadt (DE); Heini Wilhelm Eisele, Kernen-Stetten (DE)

(73) Assignee: Festo AG & Co., Esslingen (DE)

( * ) Notice: Subject to any disclaimer, the term of this patent is extended or adjusted under 35 U.S.C. 154(b) by 121 days.

(21) Appl. No.: 10/221,612

(22) PCT Filed: Feb. 1, 2001

(86) PCT No.: PCT/EP01/01069

§ 371 (c)(1),
(2), (4) Date: Sep. 13, 2002

(87) PCT Pub. No.: WO01/68490

PCT Pub. Date: Sep. 20, 2001

(65) Prior Publication Data

US 2003/0049103 A1 Mar. 13, 2003

(30) Foreign Application Priority Data

Mar. 15, 2000 (DE) ..................................... 200 04 746 U

(51) Int. Cl.[7] .............................................. B66C 23/00
(52) U.S. Cl. ............................... 414/751.1; 414/749.1; 198/468.6
(58) Field of Search ........................... 414/749.1, 751.1, 414/752.1, 753.1; 198/468.6

(56) References Cited

U.S. PATENT DOCUMENTS 4,400,984 A * 8/1983 Ronbeck .............. 414/752.1 X
5,536,136 A * 7/1996 Mason ................. 414/749.1 X

FOREIGN PATENT DOCUMENTS

| DD | 37 169 | 4/1965 |
|---|---|---|
| DE | 36 03 650 C2 | 8/1987 |
| DE | 37 02 108 C2 | 8/1988 |
| DE | G 91 05 666 7 U1 | 8/1991 |
| DE | 296 18 418 U1 | 2/1997 |
| DE | 200 04 746 U1 | 8/2000 |

* cited by examiner

Primary Examiner—Donald W. Underwood
(74) Attorney, Agent, or Firm—Hoffmann & Baron, LLP

(57) ABSTRACT

A manipulator device for the repositioning of parts having at least one pivot arm able to be driven to perform an oscillating pivotal movement about a pivot axis, such pivot arm so acting during the pivotal movement on a gripper carrier serving for carrying a gripper that the gripper carrier is shifted in position without changing its alignment in space along a predetermined manipulation path. The gripper carrier is connected with a cam follower, engaging a path cam defining the desired course of the manipulation path and extending some distance about the pivot axis. Furthermore, in order to move along a manipulation path at least partially departing from a circular path, the gripper carrier is movably arranged in relation to the pivot axis in a direction which is radial with respect to such radial direction so that it may perform a radial movement combined with the orbital movement about the pivot axis.

24 Claims, 3 Drawing Sheets

MANIPULATOR DEVICE FOR REPOSITIONING PARTS

This application is the U.S. National Phase of International Application Number PCT/EP01/01069 filed on Feb. 1, 2001, which claims priority to German Application No. 20004746.9 filed Mar. 15, 2000.

BACKGROUND OF THE INVENTION

1. Field of the Invention

The invention relates to a manipulator device for repositioning parts, comprising at least one pivot arm able to be driven to perform an oscillating movement about a pivot axis by a drive means, and which in the course of such pivotal movement so acts on a gripper carrier, serving for carrying a gripper, that the same is shifted without any change in its spatial alignment along a predetermined manipulation path.

2. Description of the Prior Art

A manipulator device of this type is disclosed for instance in the German patent publication 29,618,418 U1 (utility model). It is employed for the repositioning of parts, which are picked up in a first position and are shifted into a second position, where same are put down. Therefore the term "pick and place" is employed for such equipment. The respective part to be repositioned during the repositioning operation is held by a suitable gripper which is mounted on a gripper carrier of the manipulator device and together with same moves along a manipulation path caused by a drive means, only its position but not its alignment in space being changed.

In the case of manipulator device in accordance with the said German patent publication 29,618,418 U1 the gripper carrier is a component of a parallelogram system comprising two pivot arms, the manipulation path followed by it being a plain circular path. Although with this equipment the basic principle is reliable in operation and a wide variety of manipulator tasks may be implemented, there are however limits when there is a requirement of non-circular manipulation paths, as for example in the case of a substantially U-like manipulation path having mutually parallel linear path end sections, this rendering it possible to move components at the start and at the end of the repositioning operation some distance on farther linearly, as for instance t take up screws or short pieces of shaft from their holding means and to place same in the recesses provided for them.

The same set of problems occurs with the manipulator device disclosed in the German patent publication 9,105,666 U1(utility model), which here is in the form of a component of a stamping device.

Although in the case of the said German patent publication 29,618,418 U1 embodiments are described in the case of which the gripper may be shifted along a non-circular manipulation path, this possibility is definitely linked with and involve a change in the alignment in space of the gripper or, respectively, of the gripper carrier, something which for its part substantially limits the field of application.

The German patent publication 3,603,650 C2 describes a manipulator device, termed a transfer manipulator device, using which a gripper may be shifted along a non-circular manipulation path having mutually parallel path end sections while constantly maintaining the same alignment in space. However, the drive design employed in this case is relatively complex and involves a large overall size since two fluid power cylinders are called for in order to produce the desired path shape.

OBJECT AND SUMMARY OF THE INVENTION

One object of the present invention is to provide a manipulator device of the type initially mentioned, which while having compact dimensions and having a technically simple drive together with a low-price structure renders possible repositioning of parts along a non-circular manipulation path.

In order to achieve this aim there is a provision such that the gripper carrier is connected with a cam follower engaging a path cam defining the desired course of the manipulation path and extending some distance about the pivot axis, and, in order to move along a manipulation path at least partially departing from a circular path, the gripper carrier is movably mounted in relation to the pivot axis in a direction radial in relation to the axis, so that the gripper carrier may perform a radial movement combined with the orbital movement about the pivot axis.

This means that the orbital movement, caused by the pivotal movement of the pivot axis, of the gripper carrier may be combined with a radial movement owing to the cooperation of the cam follower and the path defining cam, such radial movement forcing the gripper carrier to pass along a desired non-circular manipulation path, while maintaining the alignment in space. It is hence possible to change the radius of the orbital movement in a manner dependent of the pivot angle of the pivot arm as may be required, suitable design of the path defining cam making it also possible, more particularly, to set a manipulation path, which has a substantially U-like course with two mutually parallel, linear path end sections. Accordingly, the part subject to the repositioning operation may be taken up and/or put down as part of at least one short linear movement, something which opens up new fields of application for the manipulator device, in the case of which for instance screws, short shafts or other elongated components must be inserted into a hole or some other elongated recess as part of a linear movement.

Further advantageous developments of the invention are defined in the dependent claims.

The kinematic design of the kinematics produced by the pivot arm and the cam engagement is preferably such that the directional course of the path defining cam is the same as that of the manipulation path so that there is a direct dependency, which simplifies the production of the path defining cam to a substantial extent.

If the manipulator device possesses a path defining cam with a substantially U-like course and two mutually parallel, linear path end sections, it is advantageous, if the pivot axis of at least one or of the single pivot arm is placed centrally between the linear cam end sections. This means that there will be particularly compact dimensions.

It is convenient for the gripper carrier to be able to be radially adjustably mounted on at least one pivot arm and to simultaneously engage the pivot arm in an entraining manner. In this case the gripper carrier may have a preferably roller-like entraining member fitting into a slot directed radially in relation to the pivot axis in order to produce the entraining connection. The preferably also roller-like cam follower can in this case be placed with an alignment which is coaxial in relation to the entraining member, something which again leads to particularly compact dimensions.

Although the manipulator device could in principle be produced with the use of several and more particularly two pivot arms incorporated in a articulated parallelogram, as a rule however a design with only one single pivot arm is more economic and is technically simpler to manufacture. More particularly, if only one single pivot arm is present, it is to be recommended to provide for additional support and guiding of the gripper carrier on a guide means provided in addition to the pivot arm, such guide means being able to maintain the desired alignment in space of the gripper carrier.

The additional guide means may be so designed that it exclusively renders possible two mutually perpendicular degrees of freedom of movement for the gripper carrier in order to thus to move along the desired manipulation path in one plane.

An extremely accurate guiding action for the gripper carrier is to be had if it on the one hand engages the pivot arm and on the other hand engages the path defining cam by way of the cam follower, it being provided with a linear guide rail mounted so as to be able to be slid on a guide slide in a first movement direction linearly, such guide slide being for its part being mounted in a linear guide for adjustment in a second direction of movement at a right angle to the first movement direction, the plane of movement defined by the two directions of motion extending at a right angle to the axis of the pivot arm.

In order for the user to be able to reset and adjust the manipulator device it is best provided with abutment means, which render possible resetting the length of the manipulation path moved along by the gripper carrier and which are preferably so arranged that they cooperate with the gripper carrier. Furthermore, shock absorber means may be provided at the ends of the gripper carrier's manipulation path in order to provide for a damped braking of the gripper carrier on reaching the respective end position.

In accordance with a further advantageous design that path defining cam is a component of several, for example plate-like, cam carriers which are able to be at least partly adjusted in relation to one another in order to affect the course or shape of the path defining cam. It is in this manner that for example the length of at least one cam section may be reset, for example for adaptation to the length of the displacement of a part to be repositioned and moved between a start and an end position.

As a drive means for producing the pivotal movement at least one pivot arm it is convenient to utilize a fluid power rotary drive, which is designed in the form of a direct component of the manipulator device.

Preferably attachment means are provided on the gripper carrier, such means rendering possible a detachable mounting of a gripper so that in case of need simpler replacement of a gripper is possible while leaving the gripper carrier in place.

BRIEF DESCRIPTION OF THE DRAWINGS

In the following a description of the invention will be provided with reference to the accompanying drawings.

DETAILED DESCRIPTION OF THE PREFERRED EMBODIMENTS

Figure 1:
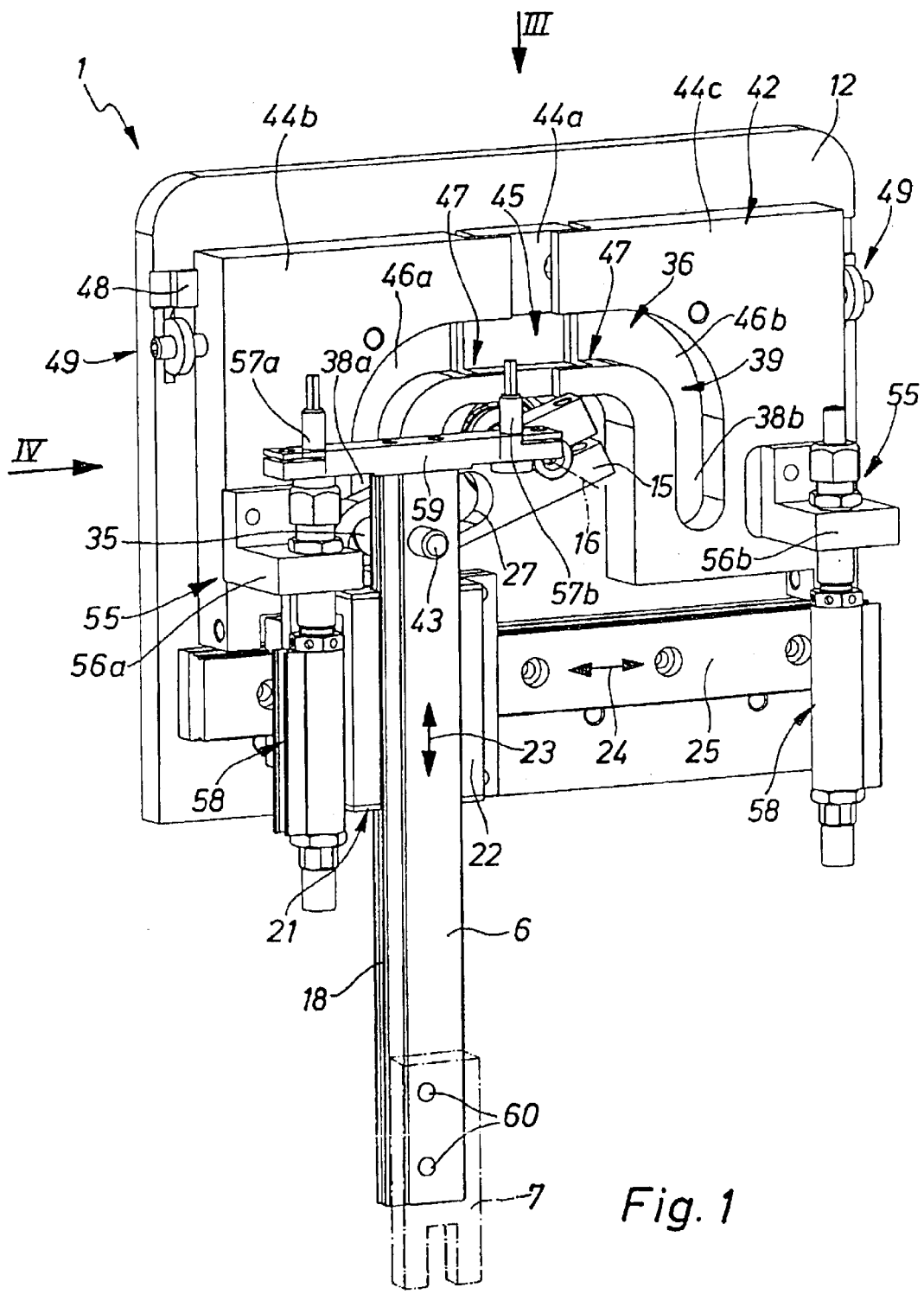
FIG. 1 shows a perspective front elevation of a preferred embodiment of the manipulator device in accordance with the invention.
Figure 2:
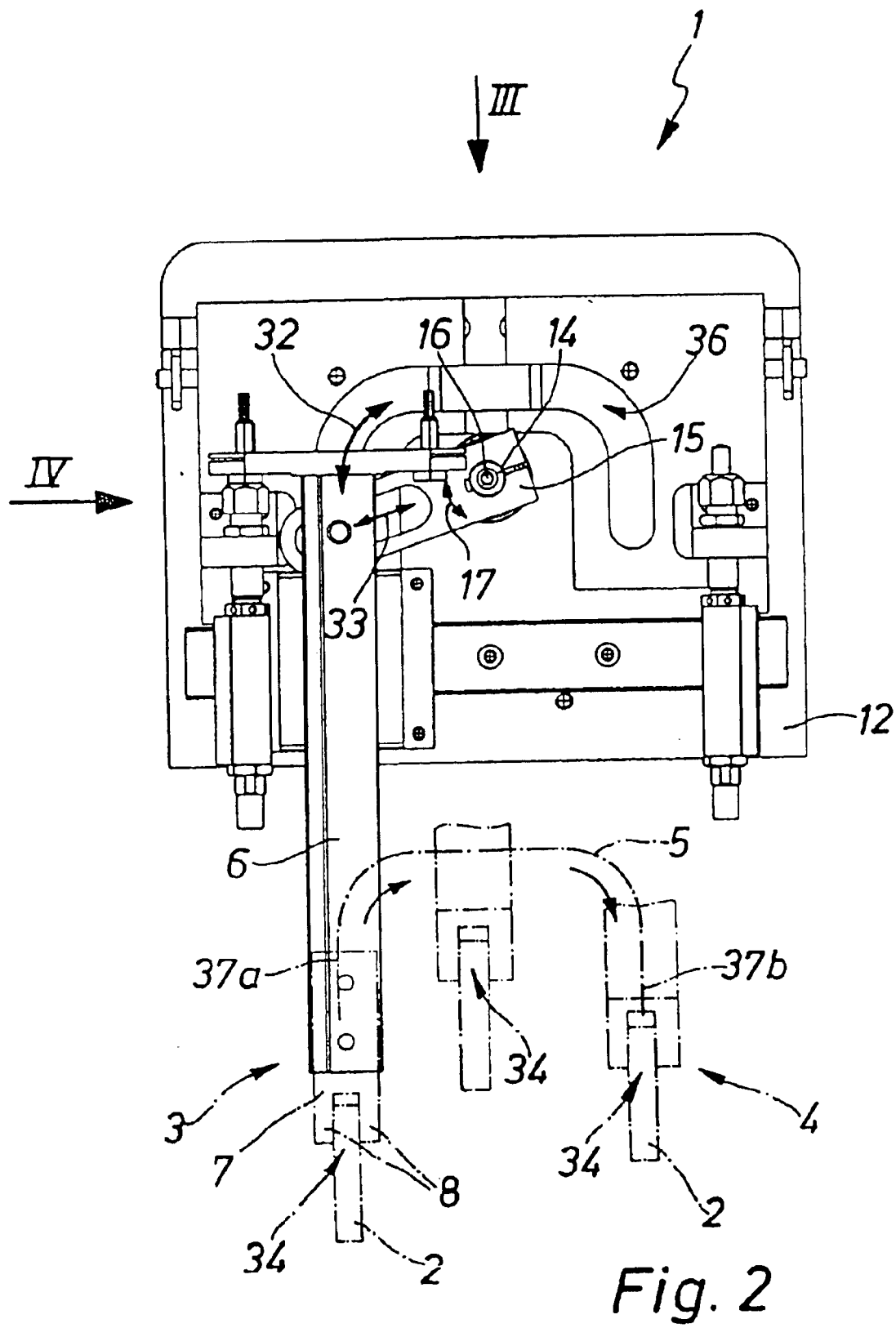
FIG. 2 shows the manipulator device of FIG. 1 in a front view thereof.
Figure 4:
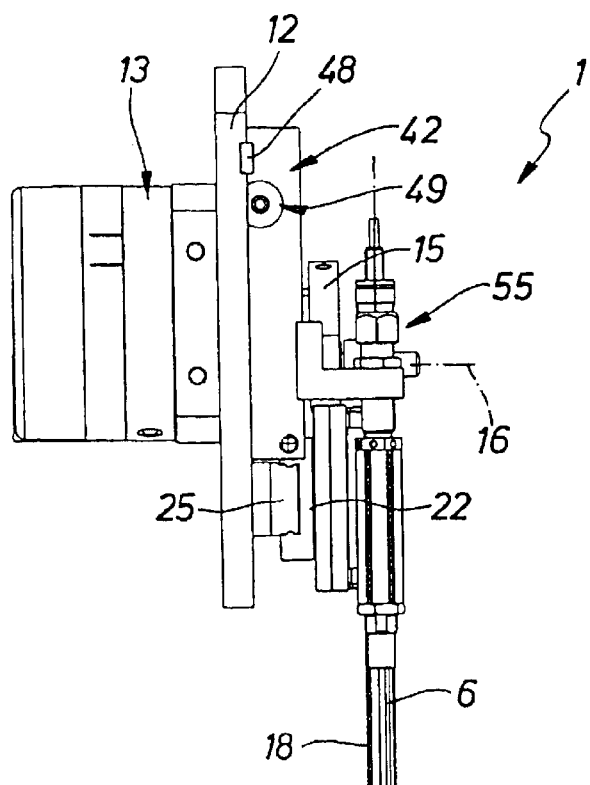
FIG. 4 is a lateral elevation of the manipulator device looking in the direction of the arrow IV.
Figure 3:
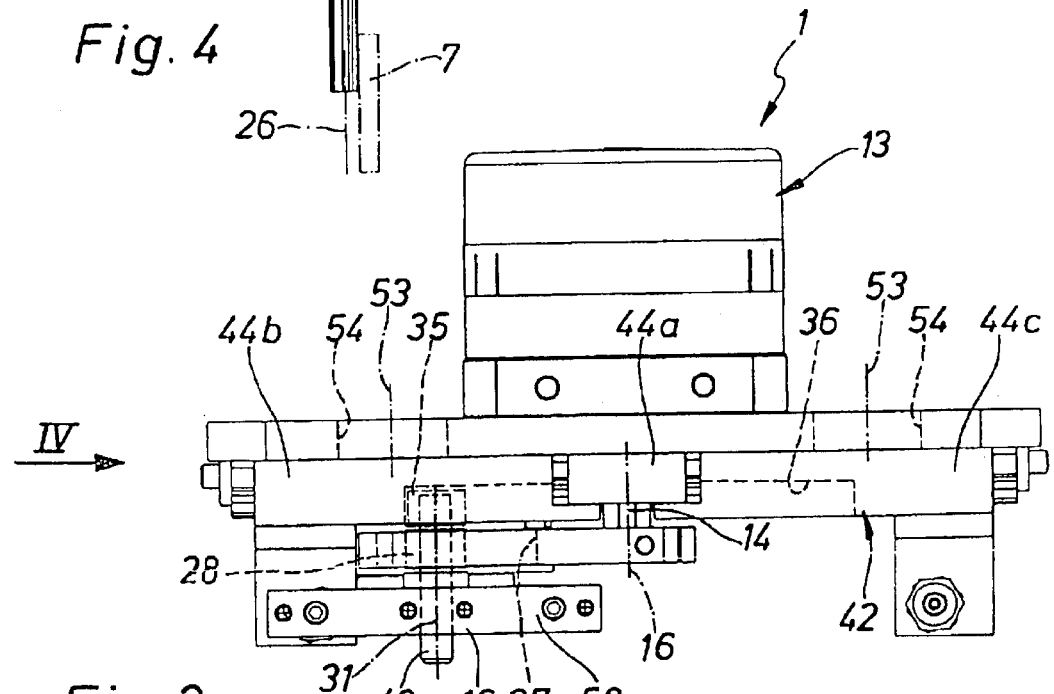
FIG. 3 shows the manipulator device of FIGS. 1 and 2 from above looking in the direction of the arrow III.

The manipulator device generally referenced 1 in the drawings renders possible sequential repositioning of parts of any desired type, and more particularly of small components such as screws, bolts or other part which are longer than they are wide. In the drawing such a part to be repositioned is indicated at 2 in chained lines.

The manipulator device 1 is so designed that the part 2 is able to be shifted during a repositioning operation between two spaced end positions 3 and 4, the path described then by it also corresponding to the course of a manipulation path 5 only marked in chained lines, such manipulation path being followed by a driven gripper carrier 6, which is fitted with a gripper 7, of some suitable type, serving for releasable holding the part which is to be repositioned.

The gripper 7 may for example be a tongs-like gripper which has pivotal gripping jaws 8, which may be drive electrically or, more preferably, by fluid power, in order to grip or release a part 2 as may be required. Further possible designs of the gripper 7 would for instance be a suction gripper or a magnetic gripper, which could hold the part to be manipulated by suction or by magnetic force.

The manipulator device 1 comprises as a base a preferably tabular carrier body 12, on whose rear side a drive means 13 is mounted, which is more particularly in the form of a single fluid power rotary drive. A drive shaft 14 of the drive means 13 extends through the carrier body 12 and at the front side of the carrier body 12 bears a pivot arm 15 extending away radially.

Instead of a fluid power rotary drive it would also be possible to have an electrically operated rotary drive.

By activating the drive means 13 it is possible to cause the drive shaft 14 to perform a reciprocating rotary movement about its longitudinal axis, such longitudinal axis simultaneously constituting the pivot axis 16, in relation to which the pivot arm 15 locked in rotation on the drive shaft 14 may accordingly be driven to perform an oscillating pivotal movement 17 about the pivot axis 16.

In the working embodiment the gripper carrier 6 is constituted by an elongated, rod- or slat-like part and is provided with a linear guide rail 18 extending in the length direction thereof. This guide rail may be in the form of a separate part or as an integral component of the gripper carrier 6. The guide rail 18 extends in a plane at a right angle to the pivot axis 16.

The guide rail 18 serves to provide a sliding supporting action for the gripper carrier 6 on a guide carriage 22 for linear motion in a first direction 23 of movement as indicated by the double arrow. The guide carriage 22 for its part runs on a linear guide 25 for position adjustment in a second direction 24 of movement at a right angle to the first direction 23 of motion. The linear guide 25 is in the present working embodiment constituted by a guide rail, which is attached to the front side of the carrier body 12 and is straddled by the guide carriage 22.

By a combination of the mutually perpendicular directions 23 and 24 of movement it is consequently possible for the gripper carrier 6 to be brought into any desired position in a plane 26 of movement which is at a right angle to the pivot axis 16.

The gripper carrier 6 is in the present working example connected in an entraining manner with the single pivot arm 15 of the embodiment so that when there is a pivoting movement of the pivot arm 15 the gripper carrier 6 is moved in a predetermined fashion as well. The entraining engagement is such that the gripper carrier 6 is mounted on the pivot arm in relation to the pivot axis 16 in a radially adjustable manner. In the working embodiment there is possible because a slot 27 is provided in the pivot arm 15 extending in the longitudinal direction thereof and radially in relation to the pivot axis 16, an entraining dog 28, which is mounted on the gripper carrier 6, fitting into it. The entraining dog 28 is in the working example in the form of a roller body, rotatably mounted on the gripper carrier 6, the axis 31 of rotation running parallel to the pivot axis 16.

If the pivot arm 15 performs a pivoting movement, the flank, which is currently aligned in the pivoting direction, of the slot 27 will act on the entraining dog 28 and will move the gripper carrier 6 as well so that the latter will then perform an orbital movement 32 in relation to the pivot axis 16.

Owing to the slot engagement with the pivot arm 15 and furthermore owing to the guide means 21, which give the gripper carrier two mutually perpendicular degrees of freedom of motion—the guide means 21 comprising the guide rail 18, the guide carriage 22 and the linear guide 25—it is possible for the gripper carrier 6 to simultaneously perform a combined radial movement 33, indicated by the double arrow, in relation to the pivot axis 16.

The guide means 21 has the effect that the gripper carrier 6 is at all times so supported and guided that it will keep its alignment in space independently of the current position. Although it does change its position in space, it remains parallel to itself, that is to say without changing its angular setting or alignment. The consequence of this is that the portion 34 of the gripper carrier 7 engaging the part 2 to be manipulated always points or faces in the same direction, this direction being vertically downward in the working example.

The course or form of the above mentioned path 5 of movement is set by having a cam follower 35 arranged on the gripper carrier 6 for following a manipulation path cam 36 for some distance about the pivot axis 16. While the gripper carrier 6 accordingly performs its orbital movement 32, its cam follower 35 runs with a positive engagement and positive guiding action on the path defining cam 36, whose form makes it possible to set the current radial position, and accordingly the radial movement 33 of the gripper carrier 6, in a manner dependent on the angle of pivoting. Accordingly by having a suitably set or predetermined course of the path defining cam 36 it is possible to arrive at the desired form for the manipulation path 5.

In the working embodiment the course of the path defining cam 36 is so selected that the manipulation path 5, along which the gripper carrier 6 and hence the gripper 7 as well move, has an essentially U-like shape with two mutually parallel linear path end sections 37a and 37b. Owing to the kinematic design adopted in the working example as explained above in the present case the forms of the path defining cam 36 and of the manipulation path 5 correspond t each other. This facilitates manufacture, because the shape of the path defining cam 36 can set the form of the manipulation path 5 1:1.

Accordingly in the working example the path defining cam 36 has an essentially U-like course with two mutually parallel linear cam end sections 38a and 38b, it being convenient for the ends of the cam end sections 38a and 38b to face in the same direction as the gripper section 34, that is to say in the present case vertically downward. The path defining cam 36 and consequently also the manipulation path 5 have a U-like course with a downwardly directed U opening.

The pivot axis 16 of the preferably single pivot arm 15 is in the present working example best placed centrally between the two end sections 38a and 38b of the path defining cam 36. This leads to particularly small dimensions of the manipulator device both in the width and also in the height direction.

The gripper carrier 6 therefore engage on the one hand the pivot arm 15 and on the other hand engages the path defining cam 36 by way of cam follower 35 with a guiding action. The path defining cam 36 is in the working example defined by the flanks of a slot 39 following cam shape or course, such slot 39 being formed on a cam carrier means 42, which in this embodiment is mounted on the front side of the carrier body 12. The cam follower 35 extends from the front into the slot 39, which may be closed by the carrier body 12 or by a corresponding wall of the cam carrier means 42 so that a groove-like structure results.

The cam follower 35 is in the working embodiment constituted by a roller body, carried like the entraining dog 28 on anti-friction-bearing means, such cam follower 35 fitting with slight play into the slot 39 so that it can roll along the flanks thereof.

The cam follower 35 is preferably arranged coaxially to the entraining dog 28 so that there are corresponding or identical axes 31 of rotation. Both components may be jointly mounted on a bearing shaft 43 fixed on the gripper carrier 6. In this case the arrangement is preferably such that the gripper carrier 6, designed in the form of an elongated body, extends past the pivot arm 15 which is accordingly between the gripper carrier 6 and the carrier body 12, the bearing shaft 43 extending through the slot 27 and carrying at the slot 27 the entraining dog 28 and, underneath same, the cam follower 35.

The cam carrier means 42 comprises, in the present working example, several plate-like carriers 44, which are mounted in a plane, parallel to the plane 26 of movement, on the front side of the carrier body 12. These cam carriers 44 are able to be repositioned in this plane at least partly in relation to each other in order to affect the course of the path defining cam 36. In the working embodiment there is the advantage of being able to change the length of a given cam section, which is in the following will be referred to as a variable length cam section 45.

Assuming the U-like shape of the path defining cam 36 the variable length cam section 45 will correspond to the connecting section, running between the limbs of the letter U, which in the present case has a linear configuration. The U-like configuration is therefore made up of the two mutually parallel linear cam end sections 38a and 38b, of the intermediately placed, variable length cam section 45 and of a respective arcuate transitional section 46a and 46b between the variable length cam section 45 and a respective cam end section 38a and 38b.

The cam carriers 44 are so designed that the flanks, defining the path defining cam 36, of the slot 39 overlap in the longitudinal direction of the cam, the degree of overlap being dependent on the currently assumed setting.

In the actual working example there is a central cam carrier 44a, which is immovably secured on the carrier body 12 and which defines at least part of the length of the variable length cam section 45. At opposite sides this central cam carrier 44a is flanked respectively by an outer cam carrier 44a and 44b, on which the remaining cam sections are provided which are able to be repositioned or set in relation to carrier body 12 in the longitudinal direction of the variable length cam section 45 and are able to be locked in the collected position. Dependent on the setting there will be a variable width overlap between adjacent slot flank parts in overlap region 47 as indicated by arrows.

In order to be able to arrive at the desired setting the two movable outer cam carriers 44 are seated on a guide rail 48 which is fixed on the carrier body 12 and extends parallel to the variable length cam section 45 and cooperate respectively with a set screw 49 bearing on the carrier body 12 or with some other setting mechanism, which renders possible a stepless resetting of the position.

The respectively selected position is locked in the present working embodiment by one or more attachment screws 53, which fit through the carrier body 12 from the rear side and are screwed into the respective outer cam carrier 44a and 44b. The aperture for the attachment 53 to fit through in the carrier body 12 is respectively in the form of a slot 54 so that the attachment screws 53 can be shifted in position together with the movable cam carrier 44a and 44b after release thereof in order to tighten them up in a new position.

The linear guide 25, which preferably also runs on the carrier body 12, in the present case is located in a region to the fore of the ends of the two cam end sections 38a and 38b in parallelism to the variable length cam section 45. Preferably the linear guide 25 will extend in the same plane as the cam carrier means 42.

The manipulator device 1 is preferably also provided with abutment means 55, which render possible resetting the length of the manipulation path 5 to be moved along by the gripper carrier 6. For this purpose in the present case each cam end section 38a and 38b is provided with an abutment unit 56a and 56b, which may cooperate with the gripper carrier 6 on approaching the desired end position. The gripper carrier 6 is for this purpose in the present case provided with counter abutment units 57a and 57b, which are best attached a transverse support 59 on the gripper carrier 6 and which are respectively provided for cooperation with one of the abutment units 56a and 56b. Suitable possibilities of adjustment, for instance using an adjustment screw thread, render possible a stepless resetting of the position.

The manipulator device 1 is furthermore preferably provided with shock absorber means 58, which like the abutment means 55 are provided for the ends of the manipulation path 5 moved along by the gripper carrier 6 and can cooperate with the gripper carrier 6 in order to damp impact on reaching the end position as set by the abutment means. The shock absorber means 58 may be simple buffer means, but are preferably in the form of hydraulic shock absorbers. In the working embodiment each abutment unit 56a and 56b is designed in the form of a structural unit with one shock absorber.

Although the manipulator device may be designed using several and more particularly two pivot arms 15, a design is as a rule preferred with only one pivot arm 15, because this provides manufacturing advantages and leads to smaller dimensions with more economic manufacture.

As regards the gripper 7 it is to be noted that same is preferably releasably mounted on the gripper carrier 6 so that in case of need substitution may take place for a particular task. Suitable attachment means are indicated at 60.

What is claimed is:

1. A manipulator device for repositioning a part comprising:
    a pivot arm;
    a drive means for rotating said pivot arm about a pivot axis;
    a gripper for releasably holding the part to be repositioned;
    a guide carriage configured to be moved along a first line located in a plane, said pivot axis being normal to said plane;
    a gripper carrier for carrying said gripper, said gripper carrier being supported by said guide carriage and configured to be moved relative to said guide carriage along a second line located in said plane, said first line being perpendicular to said second line;
    a path cam for defining a manipulation path about said pivot axis for said gripper;
    a cam follower mounted to said gripper carrier and configured to engage said path cam so that said gripper follows said manipulation path,
    wherein said pivot arm is configured to act on said gripper carrier to move said gripper along said manipulation path.

2. The manipulator device as set forth in claim 1, wherein said manipulation path partially departs from a circular path.

3. The manipulator device as set forth in claim 1, wherein said manipulation path has a substantially U-like shape having two mutually parallel linear path end sections.

4. The manipulator device as set forth in claim 1, wherein said path cam is formed with a course for defining said manipulation path, said course corresponding to said manipulation path.

5. The manipulator device as set forth in claim 4, wherein said course has a substantially U-like shape having two mutually parallel linear cam end sections; and
    said pivot axis being located centrally between said cam end sections.

6. The manipulator device as set forth in claim 1, wherein said gripper carrier defines a rotation axis which is parallel to said pivot axis, said gripper carrier being linked to said pivot arm at said rotation axis so that said rotation axis is radially adjustable in relation to said pivot axis.

7. The manipulator device as set forth in claim 6, further comprising:
    an entraining dog connected to said gripper carrier at said rotation axis; and
    wherein said pivot arm is formed with a slot extending radially in relation to said pivot axis and said rotation axis; and
    said entraining dog being configured to fit within said slot to form an entraining engagement.

8. The manipulator device as set forth in claim 7, wherein said cam follower is a roller body mounted at said rotation axis on said gripper carrier in a coaxially arrangement with said entraining dog.

9. The manipulator device as set forth in claim 1, wherein said gripper carrier is supported to have two mutually perpendicular degrees of freedom of movement in said plane.

10. The manipulator device as set forth in claim 1, further comprising an abutment means for supporting said gripper carrier at locations corresponding to each end of said manipulation path.

11. The manipulator device as set forth in claim 10, further comprising a shock absorber means for dampening an impact associated with said abutment means and said gripper carrier.

12. The manipulator device as set forth in claim 4, wherein said path cam comprises at least two cam carriers, each cam carrier including a portion of said course and being configured to be repositioned relative to another cam carrier to adjust said course.

13. The manipulator device as set forth in claim 12, further comprising a carrier body for mounting said cam carriers in a second plane which is parallel to said plane.

14. The manipulator device as set forth in claim 1, wherein said drive means is a fluid power rotary drive.

15. The manipulator device as set forth in claim 1, wherein said drive means is a electrically operated rotary drive.

16. The manipulator device as set forth in claim 1, wherein said gripper is releasably attached to said gripper carrier.

17. The manipulator device as set forth in claim 1, wherein said gripper carrier includes a guide rail for providing a sliding supporting action on said guide carriage for movement along said second line.

18. The manipulator device as set forth in claim 17, further comprising a linear guide for providing a sliding supporting action to said guide carriage for movement along said first line.

19. The manipulator device as set forth in claim 18, further comprising a carrier body for supporting said linear guide.

20. The manipulator device as set forth in claim 19, wherein said path cam comprises at least two cam carriers mounted to said carrier body in a second plane which is parallel to said plane, each cam carrier including a portion of said course and being configured to be repositioned relative to another cam carrier to adjust said course.

21. The manipulator device as set forth in claim 1, wherein said drive means is configured to perform a reciprocating rotary movement about said pivot axis.

22. The manipulator device as set forth in claim 21, wherein said pivot arm is driven to perform an oscillating pivotal movement about said pivot axis when said drive means is reciprocating about said pivot axis.

23. The manipulator device as set forth in claim 22, wherein said gripper carrier defines a rotation axis which is parallel to said pivot axis; and said pivot arm acts on said gripper carrier to orbit said rotation axis about said pivot axis.

24. The manipulator device as set forth in claim 23, wherein said pivot arm acts on said gripper carrier to radially move said rotation axis relative to said pivot axis.

* * * * *